Aug. 27, 1929.  J. HEUSSLER ET AL  1,725,863
GAS COOKER
Filed May 26, 1928
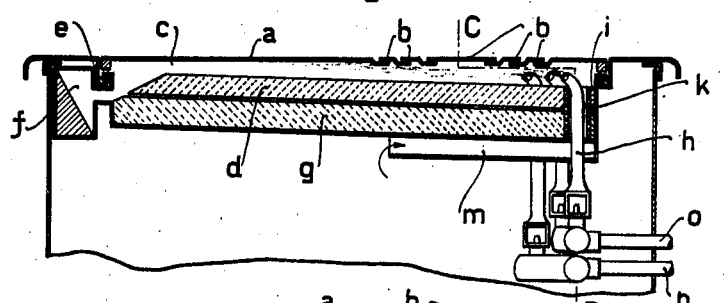
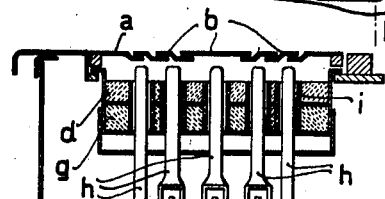
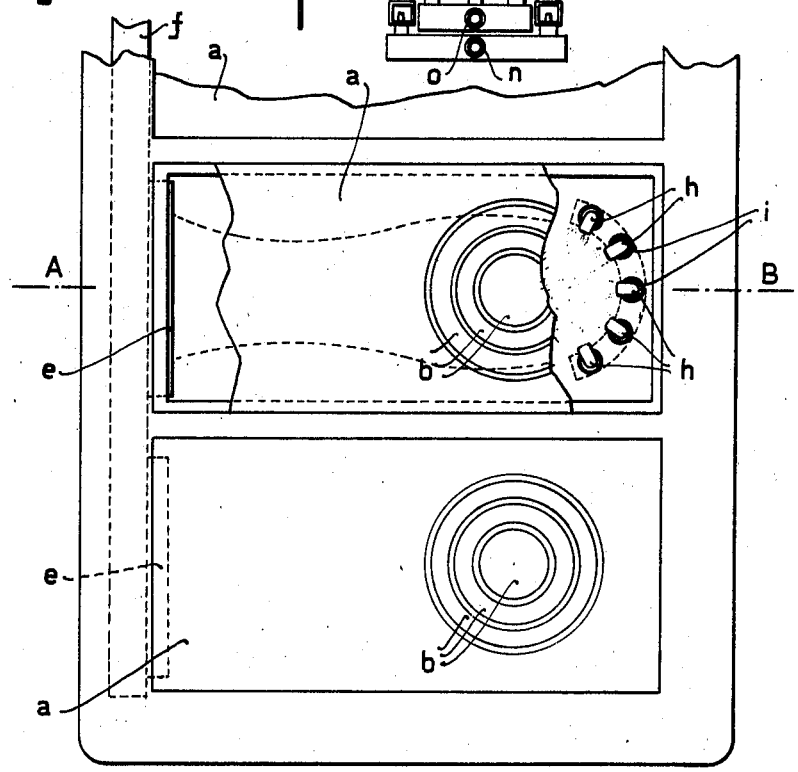
Inventors
Josef Heussler
Anton Braune
By [signature]
Atty.

Patented Aug. 27, 1929.

1,725,863

UNITED STATES PATENT OFFICE.

JOSEF HEUSSLER AND ANTON BRAUNE, OF VIENNA, AUSTRIA.

GAS COOKER.

Application filed May 26, 1928, Serial No. 280,828, and in Austria April 22, 1927.

Gas cookers are already known which have single or a plurality of adjacently disposed cooking plates with cooking holes covered by means of rings and which are heated from a source of heat outside the limits of said holes.

In the known gas cookers this source of heat consists of a straight row of gas burners arranged parallel to one side of the cooker, but although said burners heat the stove plate, they do not allow the flame to be intensively concentrated underneath the holes, that is to say at the precise spot where a rapid heating should take place.
According to this invention, this drawback is removed by the fact that the source of heat located outside the limits of the cooking hole consists of a group of single burners partially surrounding the cooking hole and having convergent nozzles.

A typical embodiment of such a gas cooker especially suitable for hotels, restaurants and large kitchens, is illustrated in the annexed drawings, Fig. 1 being a vertical section along the line A—B of Fig. 3;

Fig. 2 a section along the line C—D of Fig. 1, and

Fig. 3 a plan.
The cooker has, in known manner, a plurality of removable cooking plates $a$ which may be located side by side or one behind another, as required to form a closed top, and each plate being provided with a cooking hole adapted to be closed by means of rings $b$, each hole being adapted to be used independently of the others. Underneath each plate $a$ is the heating space $c$ which is bounded at its lower surface by a readily replaceable insulating layer $d$ and opens, underneath a fire bridge $e$, into a common flue $f$ leading to the chimney. Underneath the insulating layer $d$, which is made of highly refractory material such as firebrick or the like, is a second layer $g$ of a material which is a very poor conductor of heat. The burners $h$ have convergent nozzles and are disposed outside the limits of the cooking hole or ring $b$ to which they are allotted, in groups of two or three single burners, so that they cannot become clogged or fouled by any food which may boil over. Their mixing tubes are led through passages, provided with liner tubes $i$, formed in the insulating layers $d$ and $g$ in such a way as to leave between them and the tubes $i$ an annular space $k$ for the passage of the additional air required for the burners, said air entering in the direction of the arrow in Fig. 1 through a pocket or flue $m$ underneath the insulating layer $g$. This air is raised to a high temperature by the mixing tubes and reaches the heating gases, at the same time cooling the mixing tubes, so that the flames cannot backfire as the result of the burner becoming overheated.

To start boiling, in the case of large cooking vessels, the entire set of burners is employed and then, for further boiling, two or three burners (as may be required) can be extinguished by closing the corresponding supply pipes $n$ or $o$.

When it is desired to heat quickly, the rings $b$ are taken out and the cooking vessel is placed over the open hole. The wide, fan-like, upwardly directed flames, which combine to form a single wall of flame under the plate $a$ (indicated by broken lines in Fig. 2), spread over the entire surface of the bottom of the vessel in a uniform manner, so that the foodstuffs are uniformly warmed and cannot burn against the surfaces of the vessel. In order to continue the boiling, the vessels can be moved on the plate to a suitable distance from the hole, since the flow of hot gases or combustion warms the plate considerably all over. At the end of the cooking plate, the gases of combustion—which may, if desired, be utilized to best advantage for heating roasting- and bake-ovens, boilers and the like—are led away through the flue $f$ into the chimney. The insulating layer $d$ also imparts its heat to the cooking plate after the burners have been turned off, so that food can be kept warm for a long time without any further consumption of gas. Accordingly, on each plate the contents of a pan can be caused to boil, several pans kept on the boil, and several kept warm at the temperature required for the food. Since, notwithstanding this, only one burner has to be looked after, it can be given the necessary attention even at the busiest times.

What we claim is:

1. A closed top cooking range comprising a plurality of cooking plates forming the closed top of the range, each having a pot hole and cooperating pot rings, a set of gas burners partly surrounding each hole, said burners having convergent nozzles to provide a single wall of flame concentrated beneath the hole in a plate.

2. A closed top cooking range comprising a plurality of cooking plates forming the closed top, each plate having a cooking hole near one end, burner tubes partly surrounding the hole and having nozzles converging toward one another and directing flame toward the other end of the plate to produce a sheet of flame beneath the hole, an insulating layer beneath and spaced from the top, a fire bridge at the other end of the plate, said layer having openings through it larger than the burner tubes which pass therethrough, and a flue directing air to said openings.

3. A closed top cooking range comprising a removable cooking plate forming the range top and having a cooking hole near one end, readily replaceable insulation below and spaced from said plate and having burner tube passages projecting therethrough, burner tubes projecting through and smaller than said passages, nozzles for the burner tubes partly surrounding the hole and directed to converge to form a sheet of flame beneath the top and through the space between the top and insulating layer, said tubes being arranged in two sets separately and collectively operable, and a flue beneath said plate to direct additional air through the passages.

In testimony that we claim the foregoing as our invention, we have signed our names.

JOS. HEUSSLER.
ANT. BRAUNE.